United States Patent
Ablin

(10) Patent No.: US 7,125,529 B2
(45) Date of Patent: Oct. 24, 2006

(54) APPARATUS AND PROCESS FOR REACTING OVER TWO CATALYST BEDS

(75) Inventor: David W. Ablin, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 546 days.

(21) Appl. No.: 10/293,380

(22) Filed: Nov. 12, 2002

(65) Prior Publication Data

US 2004/0091404 A1    May 13, 2004

(51) Int. Cl.
B01J 8/04 (2006.01)
(52) U.S. Cl. .................. 422/211; 422/216; 422/218; 422/227
(58) Field of Classification Search ............... 422/218, 422/211, 216, 227
See application file for complete search history.

(56) References Cited

U.S. PATENT DOCUMENTS

| | | | | | |
|---|---|---|---|---|---|
| 3,620,685 | A | | 11/1971 | Rogers et al. ............ 23/288 R |
| 4,374,094 | A | * | 2/1983 | Farnham ..................... 422/218 |
| 4,374,095 | A | * | 2/1983 | Legg et al. .................. 422/218 |
| 4,421,723 | A | * | 12/1983 | Farnham ..................... 422/218 |
| 4,452,761 | A | * | 6/1984 | Farnham ..................... 422/218 |
| 6,152,992 | A | | 11/2000 | Gemmingen ................... 95/96 |
| 6,222,086 | B1 | | 4/2001 | Sharma et al. .............. 585/481 |
| 2002/0102192 | A1 | * | 8/2002 | Ward ......................... 422/181 |

FOREIGN PATENT DOCUMENTS

| EP | 0 400 698 A1 | | 12/1990 |
|---|---|---|---|
| EP | 1 022 056 A1 | | 7/2000 |
| WO | WO 99/20384 | * | 4/1999 |

* cited by examiner

Primary Examiner—N. Bhat
(74) Attorney, Agent, or Firm—John G. Tolomei; James C. Paschall

(57) ABSTRACT

Disclosed is a process for reacting feed in and an apparatus comprising a radial flow reactor including a first catalyst bed disposed between an outer wall and a centerpipe of the vessel and a second catalyst bed disposed within a centerpipe. Also disclosed is a method of loading catalyst into the radial flow reactor.

6 Claims, 2 Drawing Sheets

APPARATUS AND PROCESS FOR REACTING OVER TWO CATALYST BEDS

FIELD OF THE INVENTION

The invention relates to apparatus of the type wherein a gas or liquid is treated or reacted over two beds of contact material such as catalyst. The invention is specifically related to a radial flow reactor containing two catalyst beds.

BACKGROUND OF THE INVENTION

Radial flow reactors are widely used to contact fluid reactants that are typically gaseous with particulate catalyst. Radial flow reactors typically include a cylindrical vessel with an inlet at one end and an annular chamber or series of chambers arranged annularly around the interior periphery of the vessel for distributing reactants to an annular catalyst bed disposed inwardly of the reactant distribution chamber(s). A centerpipe is disposed inwardly of the annular catalyst bed and is in communication with a reactor outlet for the exit of product from the reactor. The annular distribution chamber(s) and the centerpipe are permeable to fluid flow but impermeable to catalyst flow to contain the catalyst bed therebetween.

Examples of processes carried out in such an apparatus include various hydroprocessing techniques such as catalytic reforming, catalyst regeneration, hydrotreating, dehydrogenation of butane, dehydrocyclodimerization and isomerization. Various catalysts and processes have been developed to effect xylene isomerization. In selecting appropriate technology, it is desirable to run the isomerization process as close to equilibrium as practical in order to maximize the yield of the desired xylene isomer, which is usually para-xylene, but can be meta-xylene or ortho-xylene.

In the isomerization of mixed xylenes to para-xylene, the most difficult component to deal with is ethylbenzene. Ethylbenzene is not easily isomerized to xylenes. Moreover, separation of ethylbenzene from xylenes in the effluent from the isomerization reactor by superfractionation or adsorption is very expensive. A widely used approach is to isomerize xylenes to obtain an equilibrium amount of desirable xylene isomer and to dealkylate ethylbenzene to form principally benzene over an ethylbenzene dealkylation type xylene isomerization catalyst. This approach commonly results in higher ethylbenzene conversion and more effective xylene isomerization, thus lowering the quantity of recycle in a loop of isomerization/para-xylene recovery and reducing concomitant processing costs. An alternative approach is to react the ethylbenzene to form a xylene mixture via conversion to and reconversion from naphthenes in the presence of a solid acid catalyst with a hydrogenation-dehydrogenation function. This approach enhances xylene yield by forming xylenes from ethylbenzene. A process that achieves conversion of ethylbenzene to xylenes, xylene isomerization and dealkylation of unconverted ethylbenzene to benzene utilizes both approaches with a two-catalyst system. Such a two-catalyst system is disclosed in U.S. Pat. No. 6,222,086 B1, which is incorporated herein by reference.

WO 99/20384 discloses a radial flow reactor with two annular catalyst beds disposed between an annular reactant distribution chamber and the centerpipe of the reactor. Catalyst loading into this reactor requires use of a cylindrical form which is placed into the radial flow reactor while respective catalyst beds are loaded inside and outside of the cylindrical form to provide two annular catalyst beds. The cylindrical form is then removed after loading of the catalyst.

Loading two separate catalyst beds using a cylindrical form can be labor-intensive. Matters are complicated when one or both of the catalyst beds must be loaded in an inert environment perhaps because they are sensitive to degradation by oxidation. In such a case, catalyst loading labor must be specially trained and must utilize special equipment. Moreover, when loading the two catalyst beds between the centerpipe and the annular distribution chamber(s), both catalysts must share the volume of the annular catalyst bed, thereby diminishing the volume of each of the catalysts that may be loaded into the radial flow reactor.

An object of the present invention is to provide an improved radial flow reactor that contains two annular catalyst beds.

Another object of the present invention is to provide a method of loading the two catalyst beds of the improved radial flow reactor and a process of using the improved radial flow reactor.

SUMMARY OF THE INVENTION

Applicant has discovered a new arrangement for providing two catalyst beds in a radial flow reactor. The first catalyst bed is contained in an annular space between a centerpipe and an outer wall of the reactor. The first catalyst bed may also be contained in an annular space between the centerpipe and annularly arranged distribution chambers or a cylindrical screen defining an annular distribution chamber disposed inside the outer wall. The second annular catalyst bed is provided in the centerpipe. An inner passage may be provided within the catalyst bed disposed in the centerpipe to allow the removal of product fluids from the reactor. In this arrangement, the same or different catalysts can be loaded into each of the catalyst beds without the use of a form. The centerpipe containing the second annular catalyst bed can be inserted into the radial flow reactor, before a catalyst is loaded in the first catalyst bed between the centerpipe and the outer wall of the reactor. Alternatively, catalyst can be loaded into a fluid-permeable cylindrical insert and then be loaded into the centerpipe of a radial flow reactor before or after catalyst is loaded into the first catalyst bed. Lastly, a reactant feed may be catalyzed sequentially over two separate catalyst beds, one of which is in the centerpipe of a radial flow reactor.

DETAILED DESCRIPTION OF THE DRAWINGS

Figure 1:
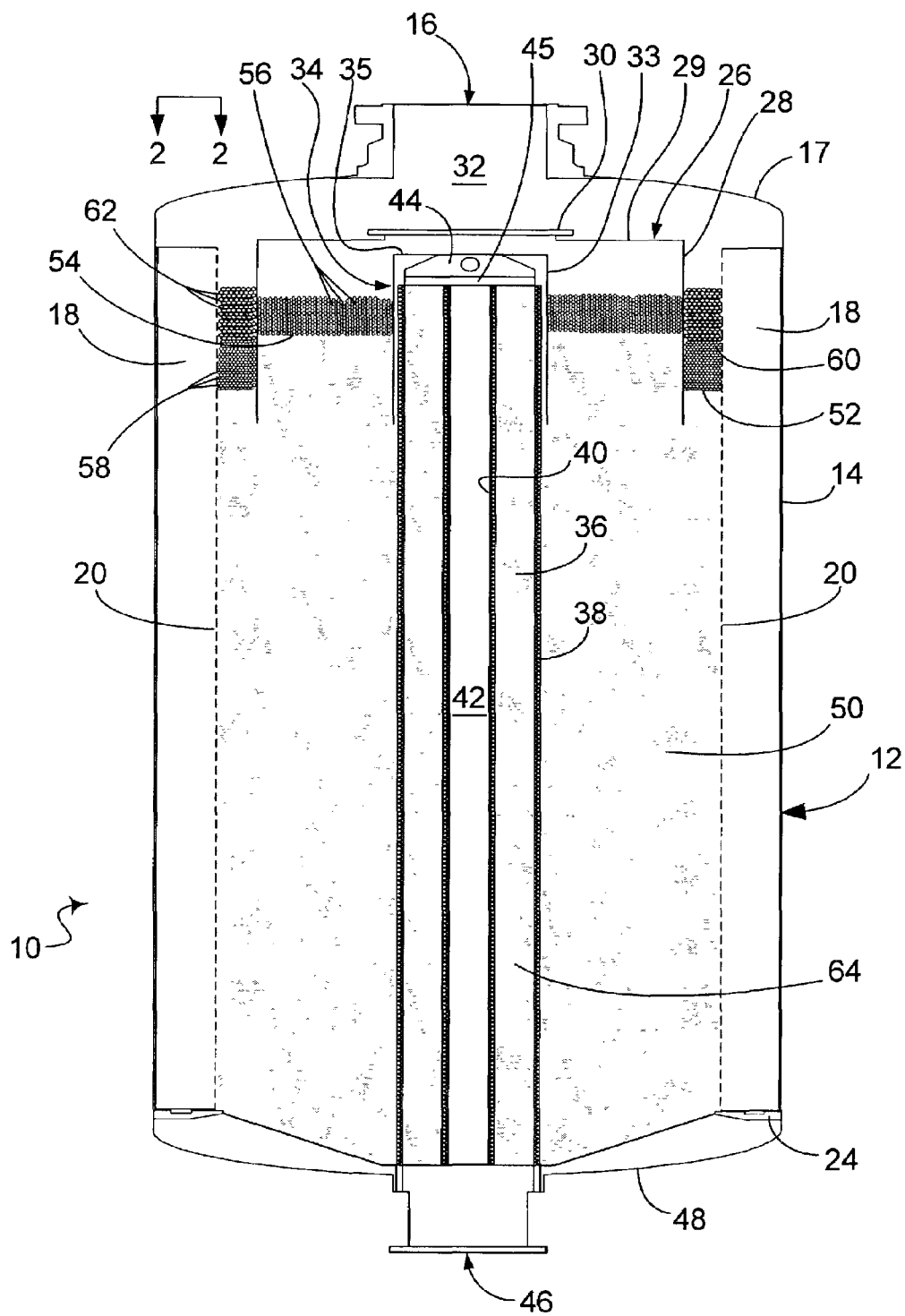
FIG. 1 is an elevational schematic view of a radial flow reactor of the present invention.

FIG. 1 illustrates an embodiment of an improved radial flow reactor 10 of the present invention. The radial flow reactor 10 comprises a reactor vessel 12 having an outer wall 14 which is cylindrical in an embodiment. An inlet 16 is disposed in a top head 17 of the reactor vessel 12. An annular distribution chamber 18 is disposed around the outer periphery of the contents of the reactor vessel 12. The annular distribution chamber 18 may comprise an inner screen 20 defining an annular chamber or may comprise a series of distribution chambers annularly disposed around the outer periphery of the inner contents of the reactor vessel 12. In the former embodiment, the inner screen 20 has openings dimensioned to be permeable to fluid flow and impermeable to particulate solids flow, and the inner screen 20 defines the annular distribution chamber 18 with the outer wall 14. The latter embodiment is best shown in FIG. 2.

Figure 2:
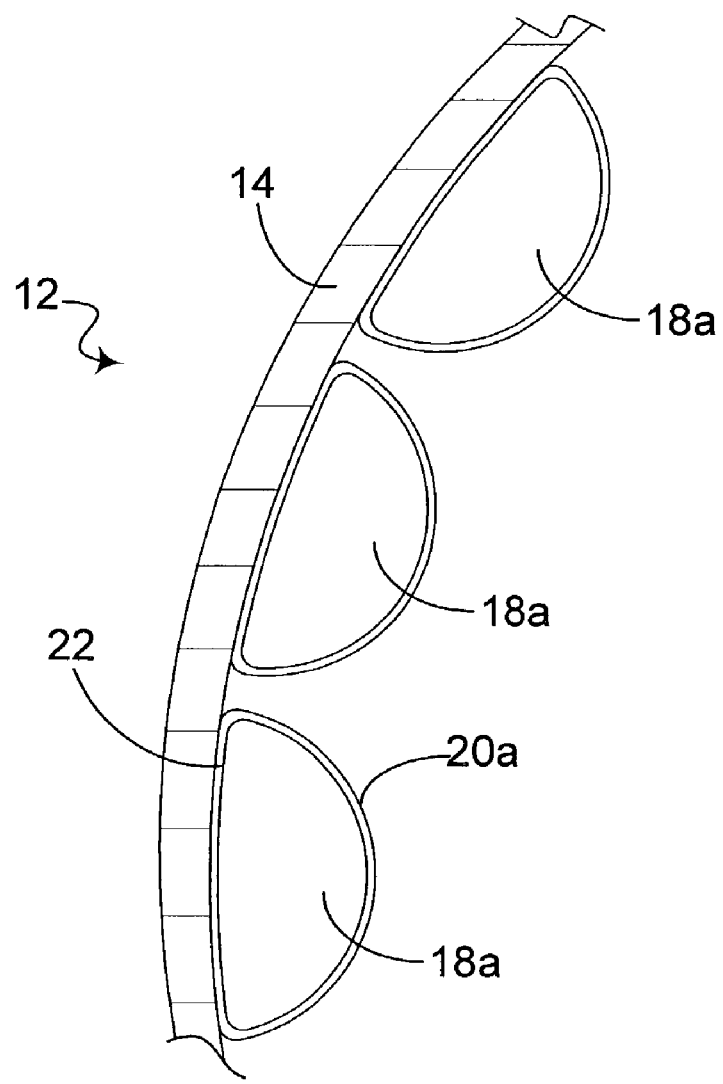
FIG. 2 is a partial cross-sectional view of FIG. 1 taken along segment 2—2.

In FIG. 2, the annular array of distribution chambers 18a comprises tubular screens having an inner arcuate side 20a and an outer arcuate side 22. The inner arcuate side 20a has a radius of curvature which is smaller than that of the outer arcuate side 22 that is disposed adjacent the outer wall 14 of the reactor vessel 12. At least the inner arcuate side 20a and perhaps both arcuate sides 20a, 22 have openings that are permeable to fluid flow and impermeable to particulate solids. The annular array of distribution chambers are known in the art as "scallops".

Turning back to FIG. 1, one or more brackets 24 are used to hold the annular distribution chamber 18 in place in the reactor vessel 12. An outer shield 26 includes a cylindrical plate 28 that is opposed to the inner screen 20 of the annular distribution chamber 18. A manway 30 provides access to the interior of the outer shield 26 through a horizontal plate 29. An inlet chamber 32 is provided between the outer shield 26 and the top head 17 of the vessel which is in communication with the inlet 16. An inner shroud 34 is disposed within and under the outer shield 26 and is above a centerpipe 36. The inner shroud 34 comprises a cylindrical wall 33 and a cover 35. The centerpipe 36 comprises an outer cylindrical wall 38 that has openings that are dimensioned to be permeable to fluid flow and impermeable to particulate matter such as catalyst. The outer cylindrical wall 38 of the centerpipe 36 may comprise a profile wire screen. The profile wire screen is known by those of ordinary skill in the art to have a triangular or trapezoidal cross-section wound along its length to provide small slits or openings between adjacent segments of the profile wire. Having a triangular or trapezoidal cross-section prevents catalyst particles from getting lodged in between adjacent segments of the profile wire as is known by those of ordinary skill in the art. The outer cylindrical wall 38 of the centerpipe 36 may comprise a perforated rolled plate impermeable to particulate solids with a profile wire screen surrounding the outer cylindrical wall 38. An inner cylindrical wall 40 may have the same construction as the outer cylindrical wall 38, with openings dimensioned to provide permeability to fluid flow and impermeability to particulate solids. The inner cylindrical wall 40 defines an inner passage 42. A bracket member 44 is secured to a top 45 of the centerpipe 36 for transporting purposes. The inner passage 42 is in communication with an outlet 46 in a bottom head 48 of the reactor vessel 12.

The annular space between the annular distribution chambers 18 and the centerpipe 36 defines an outer annular catalyst bed 50. In an embodiment, the cylindrical plate 28 of the outer shield 26 descends into the outer annular catalyst bed 50. After the outer annular catalyst bed 50 is filled with catalyst, inert balls 56, 58, 62 such as ceramic or metal balls are loaded on a catalyst level 52, 54 of the outer annular catalyst bed 50 to prevent disruption caused by fluid flow. In an embodiment, larger diameter balls 62 are loaded upon the smaller diameter balls 58 on the catalyst level 52 of the outer annular catalyst bed 50 in the space between the cylindrical plate 28 of the outer shield 26 and the annular distribution chamber 18. In an embodiment, one band of the inert balls 56 having a single diameter are loaded on the catalyst level 54 of the outer annular catalyst bed 50 between the inner shroud 34 and the outer shield 26.

The annular space between the outer and inner cylindrical walls 38, 40 defines an inner annular catalyst bed 64. The catalyst loaded into the inner annular catalyst bed 64 in an embodiment may be different from the catalyst in the outer annular catalyst bed 50.

In operation, reactant fluids such as a reactant gas flows through the inlet 16 into the inlet chamber 32 of the reactor vessel 12. The outer shield 26 directs the fluid into the annular distribution chamber 18. In an embodiment, the outer shield 26 directs fluid through the inner screen 20 of the annular distribution chamber 18. The annular distribution chamber 18 distributes the reactant fluid along the height of the annular distribution chamber 18. The fluid is then distributed through the inner screen 20 into the outer annular catalyst bed 50 through an outer surface thereof. The fluid reactants undergo a first reaction in the outer annular catalyst bed 50 and then effluent from the first reaction exits an inner surface of the outer annular catalyst bed 50. The effluent passes through the fluid-permeable outer cylindrical wall 38 of the centerpipe 36 and into the inner annular catalyst bed 64. Most of the fluid exiting the outer annular catalyst bed 50 enters the centerpipe 36 through the outer cylindrical wall 38 below the cylindrical wall 33 of the inner shroud 34. The effluent from the outer annular catalyst bed 50 undergoes a second catalyzed reaction in the inner annular catalyst bed 64. Effluent from the inner annular catalyst bed 64 exits through the fluid-permeable inner cylindrical wall 40 into the inner passage 42 and descends downwardly to the outlet 46 to be recovered from the reactor vessel 12.

In an embodiment, the reactor vessel 12 may be used to isomerize a feed of a non-equilibrium mixture of xylenes containing 5 to 15 wt-% ethylbenzene, 0 to 35 wt-% ortho-xylene, 20 to 95 wt-% meta-xylene and 0 to 15 wt-% para-xylene. The non-equilibrium mixture can be prepared by removal of para- and/or ortho-xylene from a fresh $C_8$ aromatic mixture obtained from an aromatics-production process which will typically include less than 5 wt-% para-xylene. The reactant feed may also include admixture with hydrogen at a hydrogen/hydrocarbon mole ratio of 0.5:1 to 25:1. The feed is contacted with the catalysts at suitable alkylaromatic isomerization conditions. Such conditions comprise a temperature of 100 to 500° C. and a pressure of from about 100 kPa to 5 MPa, absolute. The liquid hourly space velocity (LHSV) through the reactor vessel 12 is preferably 0.5 to 50 $hr^{-1}$ and more preferably 0.5 to 20 $hr^{-1}$. With respect to each of the catalyst beds 50, 64 comprising the catalyst system, the LHSV is within the range of about 1 to 100 $hr^{-1}$. The catalyst provided in the outer annular catalyst bed 50 in an embodiment is a non-zeolitic molecular sieve. In an embodiment, the catalyst in the outer annular catalyst bed 50 is a "SAPO" molecular sieve such as SAPO-11 with a platinum component as set forth in U.S. Pat. No. 6,222,086 B1. In an embodiment, the catalyst within the inner annular catalyst bed 64 is a zeolitic aluminosilicate. In an embodiment, ZSM-5 is the catalyst in the inner annular catalyst bed 64 with a platinum group metal incorporated thereon as set forth in U.S. Pat. No. 6,222,086 B1 which has been incorporated herein by reference. The effluent from the reactor vessel 12, when used for para-xylene isomerization, includes a greater concentration of para-xylene, benzene and naphthenes and a lower concentration of meta-xylene, ortho-xylene and ethylbenzene than contained in the feed to the isomerization reaction.

The two-bed radial flow reactor of the present invention is particularly suited for the isomerization of mixed xylenes to para-xylene using a two-catalyst system. The non-zeolitic molecular sieve catalyst, if used in the outer annular catalyst bed 50, first converts ethylbenzene to xylenes and the zeolitic catalyst in the inner annular catalyst bed 64 isomerizes the xylenes to an equilibrium amount of desirable para-xylene while dealkylating some of the unconverted ethylbenzene to benzene. The catalysts in the two catalyst beds 50, 64 work in tandem to promote conversion to para-xylene and diminish the presence of ethylbenzene which is difficult to separate from the mixture of xylene isomers. On the other hand, if the two catalysts were mixed together in the same catalyst bed, the zeolitic catalysts would be dealkylating ethylbenzene to benzene in competition with the effort of the non-zeolitic molecular sieve catalyst to convert ethylbenzene to xylene, the latter of which is the more desirable result. However, other two-catalyst systems can also be accommodated in the reactor of the present invention. It is also contemplated that the reactor of the present invention could be modified to accommodate a segregated two-catalyst system which each separately undergoes continuous regeneration. Such a reactor would require distinct catalyst hoppers with a dedicated catalyst inlet feeding each catalyst bed 50, 64 and a dedicated catalyst outlet for each catalyst bed which feeds distinct catalyst regeneration vessels.

In an embodiment, loading catalyst in the reactor vessel 12 is initiated first by loading catalyst into the inner annular catalyst bed 64 of the centerpipe 36. This is, in an embodiment, done when the centerpipe 36 is removed from the reactor vessel 12. In another embodiment, the catalyst is loaded into the inner annular catalyst bed 64 while the centerpipe 36 is contained in the reactor vessel 12, but the inner shroud 34, the horizontal plate 29 of the outer shield 26 and the top 45 of the centerpipe 36 are removed to provide access to the inner annular catalyst bed 64. Alternatively, just the manway 30 of the outer shield 26 need be removed to load the inner annular catalyst bed 64 or to place the loaded centerpipe 36 into the reactor vessel 12. Appropriate loading equipment will be required to ensure that the catalyst only fills the inner annular catalyst bed 64 if the catalyst bed 64 is loaded inside the reactor vessel 12. In another embodiment, an insert comprising a fluid-permeable, catalyst-impermeable intermediate cylindrical wall and the inner cylindrical wall 40 is filled with catalyst and loaded within the outer cylindrical wall 38 of the centerpipe 36. In an embodiment, after the centerpipe 36 is loaded with the catalyst and the inner shroud 34 is replaced, catalyst is loaded into the outer annular catalyst bed 50. The horizontal plate 29 with the manway 30 of the outer shield 26 is removed to facilitate loading. In an embodiment, the cylindrical plate 28 should be retained in place during loading. Catalyst is loaded to the catalyst level 52 both within and without the vertical cylindrical plate 28 of the outer shield 26. Upon loading 5 the catalyst to the catalyst level 52, additional quantities of the catalyst are loaded only within the cylindrical plate 28 of the outer shield 26 to the catalyst level 54. The inert balls 56 are loaded on top of the catalyst level 54 within the outer shield 26. These inert balls 56 are of a first dimension in an embodiment and serve to prevent the catalyst from fluidizing above the catalyst level 54. Once the inert balls 56 are loaded on top of the 10 catalyst level 54, the horizontal plates of the outer shield 26 are secured to the cylindrical plate 28 of the outer shield 26. In an embodiment, the inert balls 58 of the first dimension are loaded on top of the catalyst level 52 up to an intermediate level 60 at the top of the inert balls 58 and then the larger diameter balls 62 of a second dimension are loaded on top of the intermediate level 60 of the inert balls 58. In an embodiment, the second dimension is greater than the first dimension. The balls 58, 62 are loaded in the annular space between the annular distribution chamber 18 and the outer shield 26. These balls also serve to prevent fluidization of the first catalyst above the catalyst level 52.

What is claimed is:

1. A radial flow reactor comprising:
a vessel having an outer wall and an inlet;
a centerpipe within said vessel, said centerpipe including openings dimensioned to allow passage of fluid and prevent passage of catalyst particles, said centerpipe having an outer diameter that is smaller than an inner diameter of the said inlet;
a first bed between said outer wall and said centerpipe for containing catalyst particles; and
a second bed within said centerpipe for containing catalyst particles.

2. The radial flow reactor of claim 1 further comprising an inner passage within said centerpipe, said inner passage defined by a screen including openings dimensioned to allow passage of fluid but prevent passage of catalyst particles, and said second bed being between said centerpipe and said inner passage.

3. The radial flow reactor of claim 2 further including an inner annular screen defining said centerpipe, said inner annular screen including openings dimensioned to allow passage of fluid and prevent passage of catalyst, and said second bed being between said inner annular screen and said inner passage.

4. The radial flow reactor of claim 1 further including an outer screen between said first bed and said outer wall defining a distributor, said outer screen including openings dimensioned to allow passage of fluid and prevent passage of catalyst particles, an inner side of said outer screen defining an outer surface of said first bed.

5. The radial flow reactor of claim 4 wherein said outer screen comprises a tube having two arcuate sides, wherein an arcuate side with a larger radius faces the outer wall.

6. The radial flow reactor of claim 5 wherein a plurality of said tubes are annularly arrayed around said first bed.

* * * * *